United States Patent
Talwar et al.

(10) Patent No.: US 7,487,901 B2
(45) Date of Patent: Feb. 10, 2009

(54) FRICTION STIR WELDING OF JOINTS WITH SHIMS

(75) Inventors: Rajesh Talwar, Frontenac, MO (US); James M. Ogonowski, Chesterfield, MO (US); Ricky L. Martin, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 10/901,687

(22) Filed: Jul. 29, 2004

(65) Prior Publication Data

US 2006/0027630 A1 Feb. 9, 2006

(51) Int. Cl.
B23K 20/12 (2006.01)
(52) U.S. Cl. .................... 228/112.1; 228/2.1
(58) Field of Classification Search ............. 228/112.1, 228/2.1
See application file for complete search history.

(56) References Cited

U.S. PATENT DOCUMENTS

| | | | | |
|---|---|---|---|---|
| 3,051,681 A | * | 8/1962 | Partansky | 525/482 |
| 3,609,116 A | * | 9/1971 | Thomas et al. | 523/434 |
| 5,160,243 A | * | 11/1992 | Herzner et al. | 416/220 R |
| 5,460,317 A | | 10/1995 | Thomas et al. | |
| 6,045,028 A | * | 4/2000 | Martin et al. | 228/112.1 |
| 6,283,356 B1 | * | 9/2001 | Messelling | 228/119 |
| 6,450,394 B1 | * | 9/2002 | Wollaston et al. | 228/112.1 |
| 6,543,670 B2 | * | 4/2003 | Mahoney | 228/112.1 |
| 6,907,651 B1 | * | 6/2005 | Fisher et al. | 29/407.05 |
| 7,048,175 B2 | * | 5/2006 | Runyan | 228/112.1 |
| 2005/0045694 A1 | * | 3/2005 | Subramanian et al. | 228/112.1 |
| 2005/0254955 A1 | * | 11/2005 | Helder et al. | 416/233 |

FOREIGN PATENT DOCUMENTS

| | | |
|---|---|---|
| DE | 10 2005 026 505 | 12/2006 |
| EP | 1 291 115 A2 | 3/2003 |
| EP | 1 354 661 | 10/2003 |

(Continued)

OTHER PUBLICATIONS

Dictionary.com, Rigid [online]. Random House Unabridged Dictionary, Random House, Inc., 2006 [retrieved on Jan. 9, 2007], Retrieved from the Internet:<URL:http://dictionary.reference.com/browse/rigid> p. 1/1, -adjective definition No. 5.*

(Continued)

*Primary Examiner*—Kiley Stoner
(74) *Attorney, Agent, or Firm*—Alston & Bird LLP

(57) ABSTRACT

A method of friction stir welding joints with shims and an associated structural assembly is provided. The structural assembly includes one or more skin members that are disposed and friction stir welded to a substructure. A shim is disposed in a space defined by the other members of the assembly, e.g., between adjacent skin members or between a skin member and the substructure. The shim can be friction stir welded to the other members. That is, the adjacent skin members can be connected via the shim, and/or the skin members can be connected to the substructure via the shim. In some cases, the skin members and the substructure are relatively stiff, and the shim substantially fills the space to reduce flexing of the members during the friction stir welding operation.

24 Claims, 5 Drawing Sheets

FOREIGN PATENT DOCUMENTS

| | | |
|---|---|---|
| JP | 2004-017097 | 1/2004 |
| JP | 2004017097 A * | 1/2004 |
| WO | WO 2004/014593 A1 | 2/2004 |

OTHER PUBLICATIONS

Dictionary.com, Solid [online]. Random House Unabridged Dictionary, Random House, Inc. 2006 [retrieved on Jan. 9, 2007], Retrieved from the Internet:<URL:http://dictionary.reference.com/browse/solid> p. 3/3, -noun definition No. 27 and 28.*

Patent Abstracts of Japan, vol. 1998, No. 12, Oct. 31, 1998 & JP 10 193143 A (Showa Alum Corp), Jul. 28, 1998.

Search Report for PCT/US2005/027150 dated Feb. 24, 2006.

Copy of Search Report from corresponding British Application No. GB0703375.6 issued May 23, 2008.

* cited by examiner

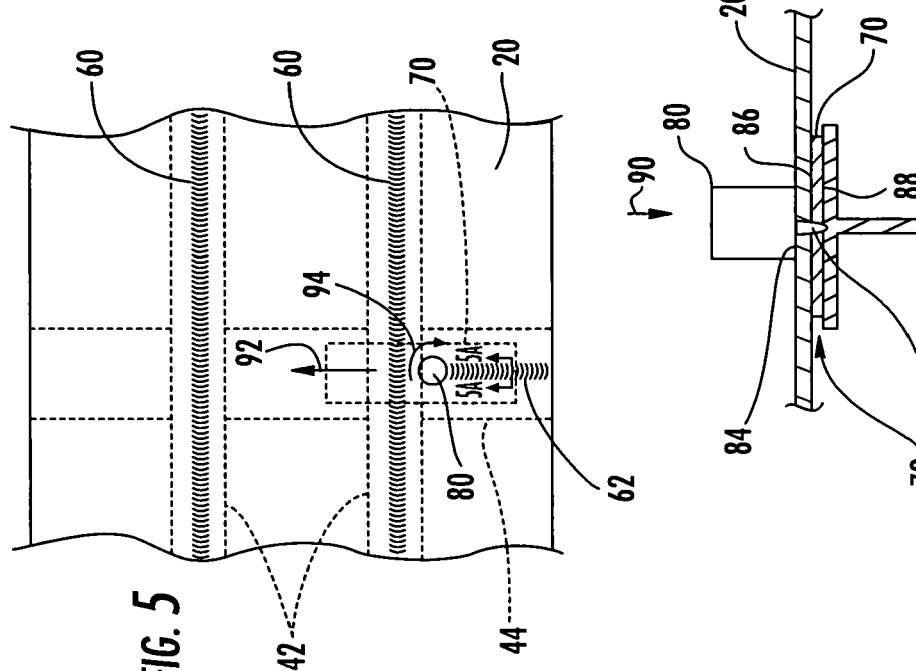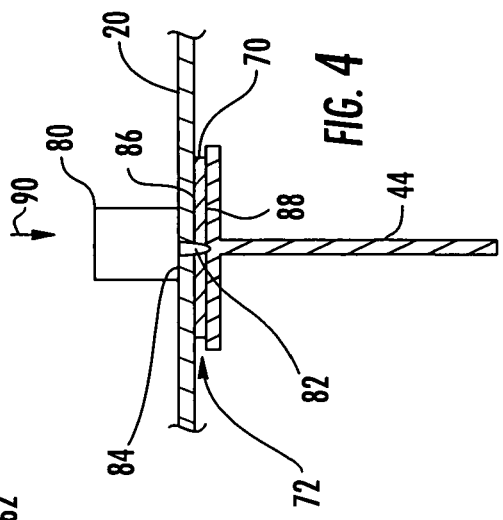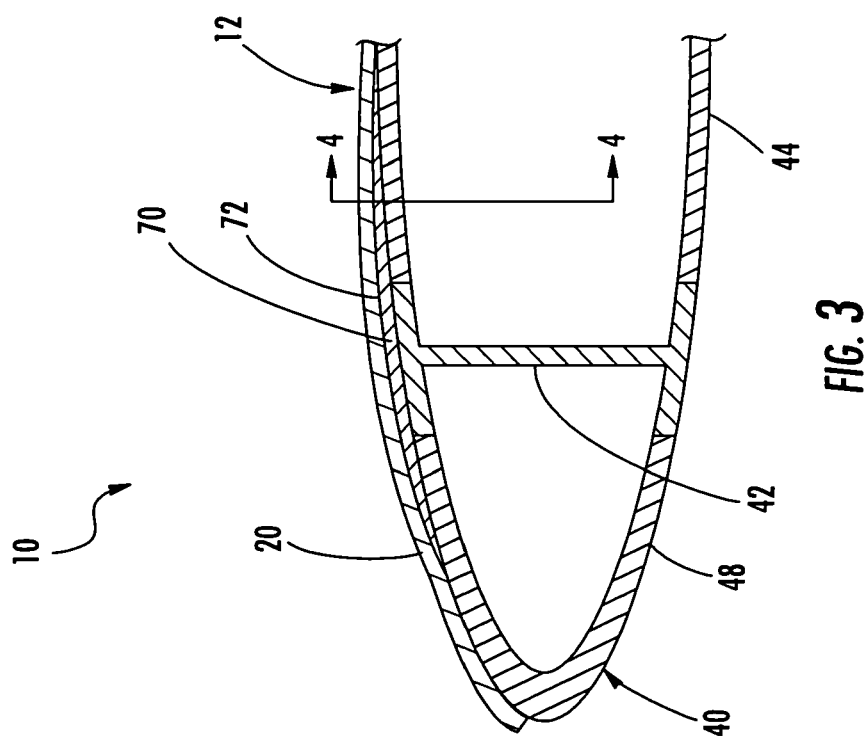

FRICTION STIR WELDING OF JOINTS WITH SHIMS

BACKGROUND OF THE INVENTION

1) Field of the Invention

The present invention relates to the joining of structural members and, more particularly, relates to friction stir welding of joints including at least one shim disposed between structural members.

2) Description of Related Art

Aerospace structural assemblies, such as wings for aircraft, typically include outer flexible sheets, or skins, that are supported in a desired contour to define the outer surface of the structure. According to one conventional method of manufacturing such structures, a number of stringers are connected to the skins to stiffen the skins and facilitate connection of the skins to an underlying support framework of the structure. The stringers, which are typically long angles, channels, or other types of beams, can be connected to the skins by riveting or welding while the skins are supported in a generally flat configuration. Thereafter, the stringers and the skins can be adjusted to the desired configuration, and the stringers are connected to spars or other members of the support framework.

In some applications, however, it is desirable to have skins that are relatively stiff. The stiffness of the skins prevents the skins from being readily flexed to the desired configuration during assembly. Therefore, the skins are formed to the desired contour. For example, the skins can be bent or stretched, or each skin can be formed of multiple portions that are connected in the desired configuration. Nevertheless, even small differences between the configuration of the formed skins and the underlying support structure can complicate the assembly or reduce the quality of the finished structure. For example, the stiffness of the skins can prevent or complicate the adjustment of the skins to accurately conform to the support framework. Small gaps or mismatches can result between the skin and the framework and/or between the different portions of the skin that are connected to the support framework. Such gaps are typically filled with putty or caulk, but the strength, durability, and/or corrosion resistance of the connections can be affected.

Therefore, there exists a need for an improved method for forming structural assemblies, especially aerospace structural assemblies that include outer contoured skins. The method should be capable of reducing the gaps between the members of the structure and improving the quality of the connections formed therebetween.

BRIEF SUMMARY OF THE INVENTION

The present invention provides a method of friction stir welding skin members and substructures and a structural assembly formed by such welding operations. For example, the structural assembly can be welded with a shim disposed in a space defined between a skin member and the substructure or between two adjacent skin members, to thereby friction stir weld the members of the assembly via the shim. Thus, the shim facilitates the formation of a desired contour of the assembly, and is further capable of improving the quality of the joints formed between the multiple members of the assembly.

According to one embodiment of the present invention, the substructure and one or more skin members are disposed to define a space, e.g., between adjacent skin members or between the substructure and one of the skin members. For example, the skin and the substructure can be provided as rigid members, either or both of which can define simple or complex geometric contours, such as the shape of an airfoil or other aerospace structure. The shim, which can have a non-uniform thickness or width to correspond to the dimensions of the space, is disposed in the space. Thereafter, the skin is friction stir welded, i.e., to form an elongate weld joint between members of the skin via the shim and/or between the skin and the substructure via the shim. In some cases, skin members can be welded to opposite sides of the substructure so that the substructure extends between the first and second skins on the opposite sides.

According to another embodiment of the present invention, there is provided a friction stir welded structural assembly that includes a substructure defining an outer contour, one or more skin members disposed on the substructure at the outer contour of the substructure, and at least one shim disposed between the skin members or between the skin member and the substructure. At least one friction stir weld joint connects the shim to the adjacent skin member(s) and or the substructure. The skin members and substructures can be rigid members, which can be formed of aluminum or other materials, and each can define a simple or complex geometric configuration. Further, skin members can be welded to opposite sides of the substructure. For example, the outer contour of the substructure and, hence, the assembly, can define an airfoil or other aerospace shape.

BRIEF DESCRIPTION OF THE SEVERAL VIEWS OF THE DRAWINGS

Figure 1:
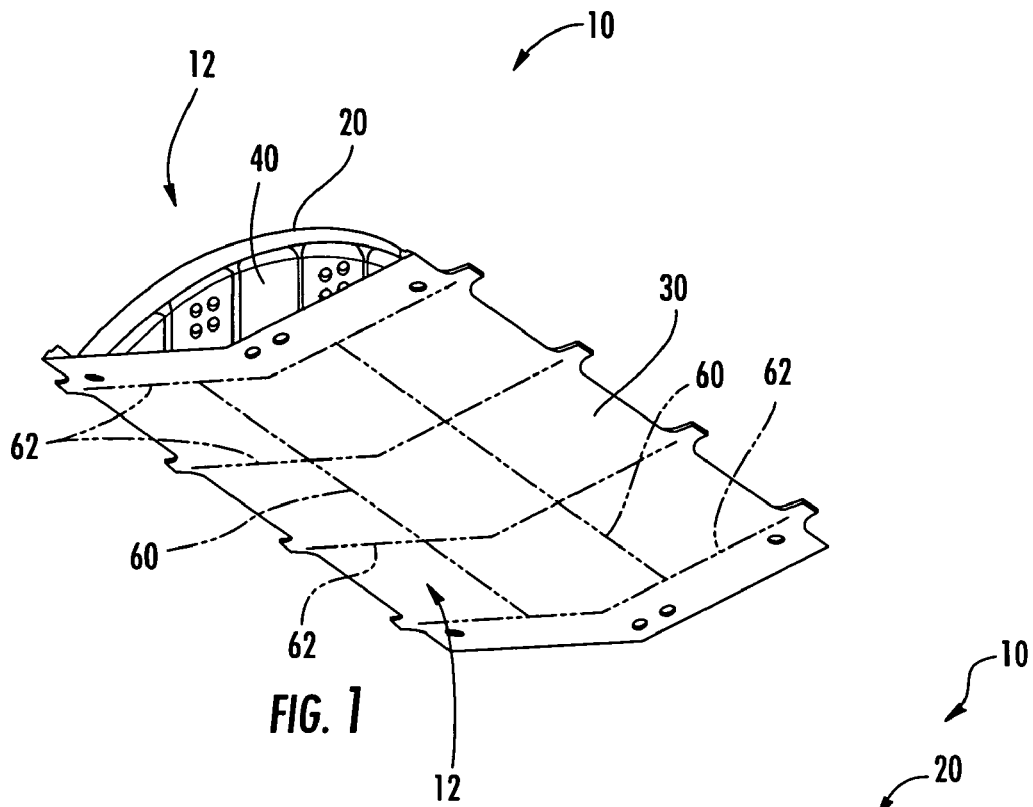
Figure 2:
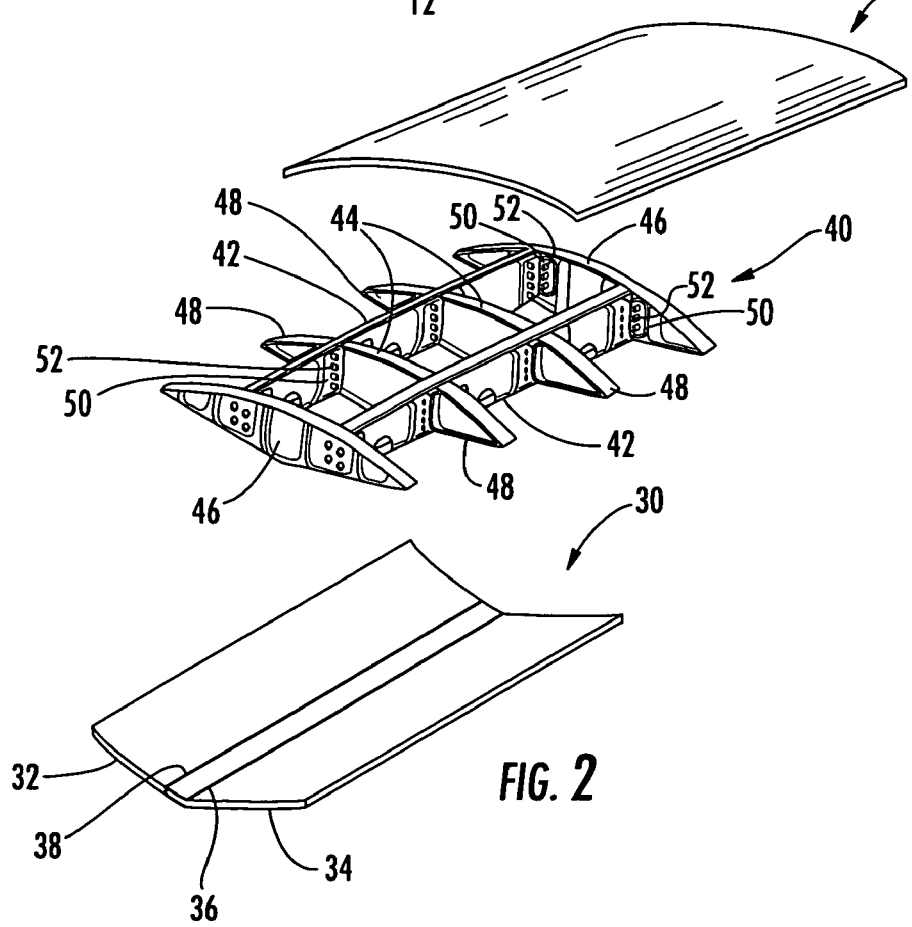
Figure 5A:
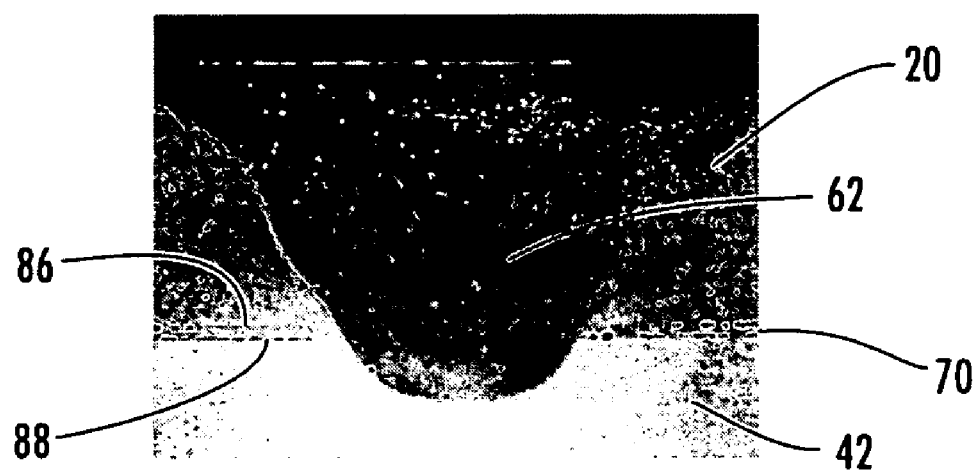
Figure 7A:
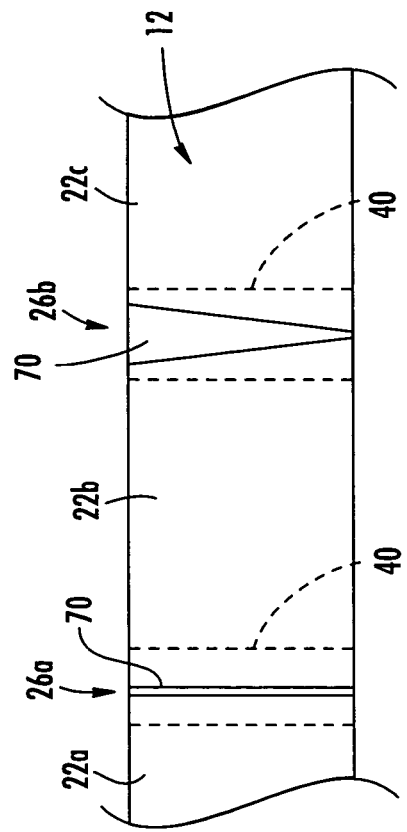
Figure 7B:
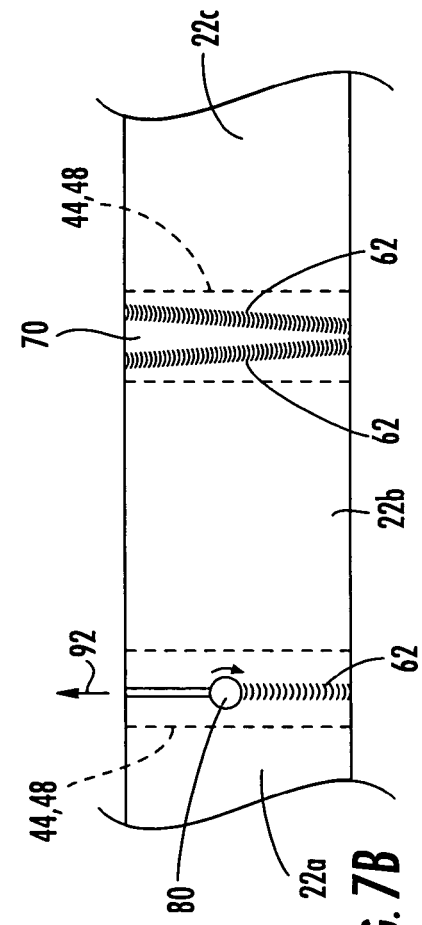
Figure 6:
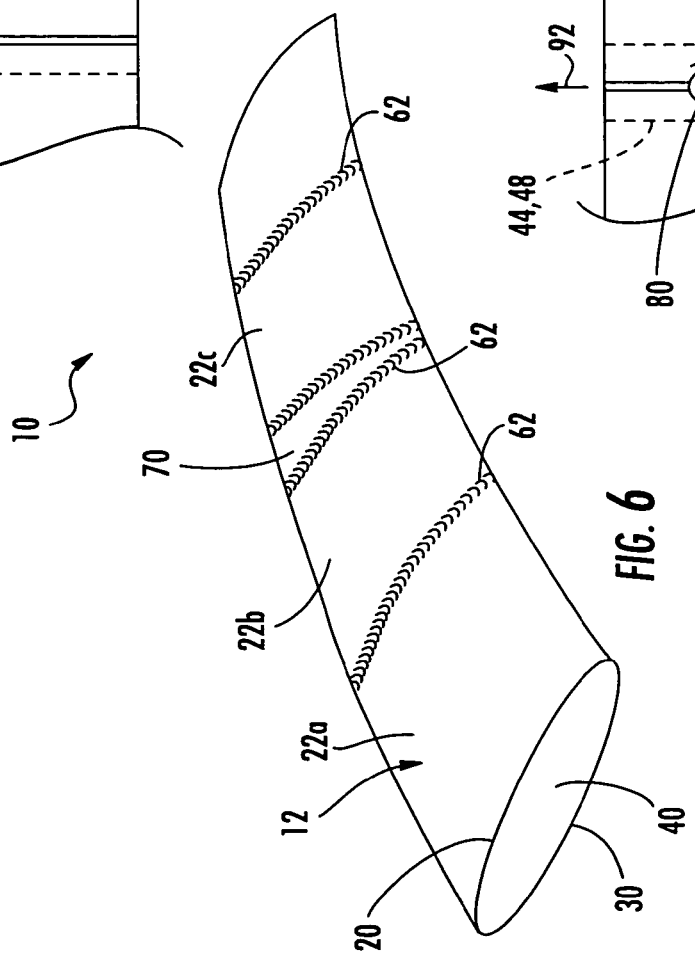
Figure 8:
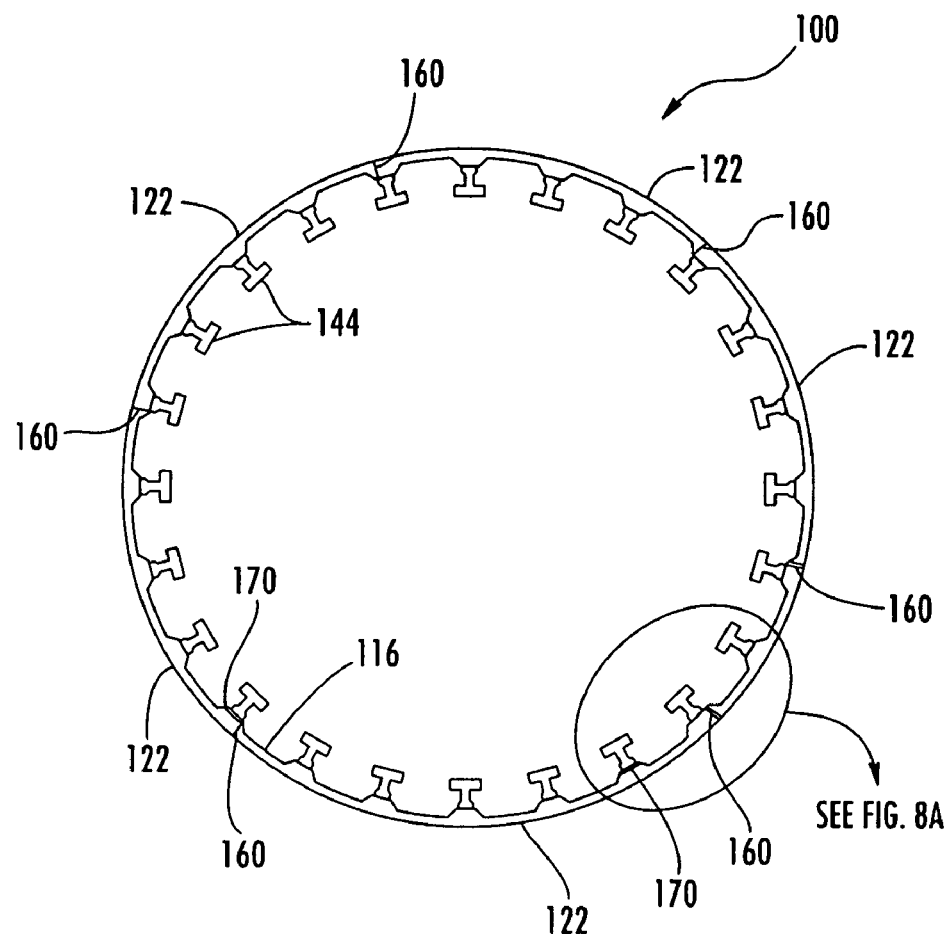
Figure 8A:
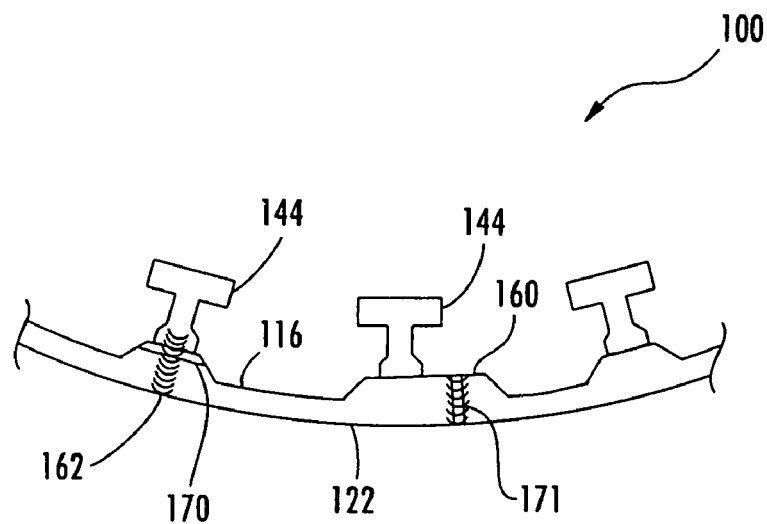

Having thus described the invention in general terms, reference will now be made to the accompanying drawings, which are not necessarily drawn to scale, and wherein:

FIG. 1 is a perspective view illustrating a structural assembly according to one embodiment of the present invention;

FIG. 2 is an expanded perspective view illustrating the structure assembly of FIG. 1 in an unassembled configuration;

FIG. 3 is a section view illustrating the structural assembly of FIG. 1 in a partially assembled configuration with a shim disposed between the skin and substructure;

FIG. 4 is a section view illustrating the structural assembly of FIG. 1 as seen along line 4-4 of FIG. 3 with a friction stir welding tool configured for joining the skin to the substructure via the skin;

FIG. 5 is a plan view illustrating the structural assembly of FIG. 4;

FIG. 5A is an enlarged section view illustrating the friction stir weld formed in the structural assembly of FIG. 4, as seen along line 5A-5A of FIG. 5;

FIG. 6 is a perspective view illustrating a structural assembly according to another embodiment of the present invention;

FIG. 7A is a plan view illustrating the structural assembly of FIG. 6 before the skin members have been friction stir welded;

FIG. 7B is a plan view illustrating the structural assembly of FIG. 7A during friction stir welding of the skin members;

FIG. 8 is a section view illustrating a structural assembly according to another embodiment of the present invention; and FIG. 8A is an enlarged section view illustrating a portion of the structural assembly of FIG. 8, as indicated in FIG. 8.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIG. 1, there is shown a structural assembly 10 according to one embodiment of the present invention. As illustrated in FIG. 1, the structural assembly 10 is an aerospace structural assembly and, more particularly, an airfoil that defines a contoured outer surface 12 such that the assembly 10 is adapted for use as a wing of an aircraft. The structural assemblies according to other embodiments of the present invention can be otherwise configured, and the assemblies can be used in a variety of applications including, but not limited to, aerospace, marine, and terrestrial vehicles and structures.

The structural assembly 10 includes a number of connected structural members, i.e., one or more skins 20, 30 disposed on a substructure 40. The members 20, 30, 40 can define various configurations according to the desired use of the structural assembly 10, the materials from which the assembly 10 is to built, the method of constructing the assembly 10, and other design criteria. As illustrated in FIG. 2, the substructure 40 includes two keels 42 extending in a longitudinal direction of the assembly 10. The keels 42 are connected by two center frames 44 extending therebetween and two bulkheads 46 connected to the longitudinal ends of the keels 42. The bulkheads 46 define a profile of the assembly 10, and a corresponding shape is defined by each of the center frames 44 in conjunction with outer frames 48 connected to the keels 42 opposite the center frames 44. The frames 44, 48 and bulkheads 46 are connected to the keels 42 by flanges 50 and bolts 52, though other connections can alternatively be used, such as weld joints, including friction stir weld joints.

The substructure 40 provides a rigid support framework for the structural assembly 10. By the term "substructure," it is meant that the keels 42 and frames 44, 48 are entirely or substantially covered by the skins 20, 30 disposed thereon. Typically, the substructure 40 defines first and second opposite sides for receiving the skins 20, 30. That is, the substructure 40 provides a stiff support that extends from the first skin 20 on the first side of the assembly 10 to the second skin 30 on the second side of the assembly 10. In combination, the first and second sides substantially define the shape of shape of the assembly 10. For example, as shown in FIG. 1, the assembly 10 can be an airfoil or other aerodynamic shape for aerospace applications, the profile of which is substantially defined by the underlying substructure 40.

Similarly, the skins 20, 30 of the assembly 10 can also define a desired contour according to the application in which the assembly 10 is to be used. In some cases, each skin 20, 30 can include portions that are flat, curved, or otherwise contoured. Further, each skin 20, 30 can be formed of multiple skin portions or member that are connected to one another before or after being connected to the substructure 40. For example, as illustrated in FIG. 2, the second skin 30 is formed of two skin members 32, 34. The first member 32 is flat, and the second member 34 defines an angle or bend 36. The members 32, 34 are joined by a friction stir butt weld 38, though in other embodiments the members 32, 34 can be joined by other weld joints or by connectors such as rivets, bolts, and the like. In any case, the portions 32, 34 can be connected to form the skin 30, such that the skin 30 is a substantially rigid member when it is subsequently attached to the substructure 40.

Alternatively, the first skin 20 is a single curved member. In particular, the first skin 20 defines a simple curve, i.e., a contour defined by a curve extending about a single axis. In other embodiments of the present invention, the skins 20, 30 and the corresponding outer contour of the substructure 10 can define a complex curve. For example, as shown in FIG. 6, each of the skins 20, 30, which together define the outer surface 12 of the assembly 10, is curved about multiple axes to define complex three-dimensionally curved contours.

The first and second skins 20, 30 are welded to the substructure 40. In this regard, FIG. 1 illustrates longitudinal and transverse weld joints 60, 62 extending through the second skin 30 to join the second skin 30 to the keels 42, frames 44, 48, and bulkheads 46 of the substructure 40. The weld joints 60, 62 can be formed by friction stir welding. Friction stir welding is a known welding technique in which a rotating friction stir welding pin or probe is inserted into the members to be joined. The pin and a shoulder from which the pin extends generate sufficient friction with the members to plasticize a portion of the members, and the plasticized material is mixed by the pin. As the plasticized material cools, a friction stir weld joint is formed, characterized by a mixed portion, or nugget, that has a refined grain structure. Friction stir welding is further described in U.S. Pat. No. 5,460,317 to Thomas, et al., the entirety of which is incorporated herein by reference. Friction stir welding can be used to form butt joints (with the pin inserted generally parallel to an interface between abutting members being joined) as well as lap joints (with the pin inserted generally perpendicular to an interface between overlapping members being joined). In fact, it is appreciated that friction stir welding can be performed with a variety of types and configurations of pins, which can be inserted into the members in various configurations.

The skins 20, 30 can be held in place against the substructure 40 during the welding operation with clamps, straps, tooling, or the like. In some cases, however, the skins 20, 30 can differ slightly in shape from the outer contour defined by the substructure 40. Thus, with the skins 20, 30 disposed against the sides of the substructure 40, spaces may be defined therebetween. The skins 20, 30 are also typically relatively rigid. That is, to the extent that the skins 20, 30 define a contour that is different than the substructure 40, the skins 20, 30 cannot be easily flexed during assembly to correspond precisely with the substructure 40. The stiffness of the skins 20, 30 can be due to the thickness, size, material, and/or geometric configuration of the skins 20, 30. In some cases, if a space is defined between one of the skins 20, 30 and the substructure 40, the skin 20, 30 can be deformed by the force exerted by the friction stir welding tool during the friction stir welding operation and/or excessive amounts of flash can be generated during the welding operation.

According to one aspect of the present invention, a space between one of the skins 20, 30 and the substructure 40 is substantially filled and thereby accommodated using a shim 70, i.e., an additional piece of structural material that is disposed as a solid member. FIG. 3 illustrates the shim 70 disposed in a space 72 between the first skin 20 and the substructure 40 of the assembly 10. The shim 70 extends longitudinally along a portion of one of the center frames 44 and the corresponding outer frame 48. As illustrated, the shim 70 can define a nonuniform shape along its length. That is, the shim 70 can be thicker or thinner along the length of the shim 70 to correspond with the shape of the space 72 between the skin 20 and the substructure 40 so that the shim 70 substantially fills the space 72. As shown in FIG. 4, the width of the shim 70 can correspond generally to the width of the frame 44.

As illustrated in FIGS. 4 and 5, a friction stir welding tool 80 is used to form the friction weld joints 60, 62 between the skin 20 and the substructure 40. In addition, the friction stir weld joints 60, 62 can be formed through the shim 70. The friction stir welding tool 80 includes a rotatable pin 82 extending from a shoulder 84. The pin 82 is inserted through an interface 86 of the skin 20 and the shim 70 and/or through an interface 88 of the shim 70 and the substructure 40, e.g., perpendicular to the interfaces 86, 88 or at an angle of about 3-5° from a line normal to the interfaces 86, 88. For example, the friction stir weld tool 80 can be configured outside the assembly 10, with the shoulder 84 of the tool 80 disposed and urged against the skin 20, and with the pin 82 configured to extend through the skin 20, through the shim 70, and into the substructure 40. The friction stir welding tool 80 is then urged in a direction 90 against the skin 20 and advanced in a direction 92 along the skin 20 as the pin 82 rotates in a direction indicated by reference numeral 94. One or more actuators (not shown) can be provided for rotating the tool 80 and adjusting the tool 80 along a predetermined path to form the welds 60, 62. The motion of the pin 82 and shoulder 84 generates frictional heat, which plasticizes material from the skin 20, shim 70, and/or substructure 40, and the plasticized material is mixed by the pin 82. As the plasticized material cools and hardens, the friction stir weld joint 60, 62 is formed connecting the skin 20 to the substructure 40 via the shim 70. Each friction weld joint 60, 62 includes a nugget region proximate to the path of the pin 82, the nugget region being characterized by a refined granular structure. FIG. 5A illustrates a section view of one of the weld joints 60 formed in the structural assembly 10.

As shown in FIGS. 4 and 5, the weld joint 62 can be formed along a center line of the center frame 44 such that the weld joint 62 extends into or proximate to a web portion of the center frame 44. Alternatively, the weld joint 62 can be formed at other locations, e.g., such that the joint 62 extends into or through a flange portion of the center frame 44. In either case, multiple friction stir weld joints 60, 62 can be formed through each shim 70. For example, the skin 20 can be connected to the substructure 40 by two friction stir weld joints 62 that join the skin 20 to one of the center frames 44 and the corresponding outer frames 48. Friction stir weld joints 60 extending in the longitudinal direction of the assembly 10 can also extend through the shim 70. In some cases, an anvil (not shown) or other support can be disposed generally opposite the skin 20, shim 70, and/or part of the support structure 40 to oppose the force of the friction stir weld tool 80 against the skin 20.

The shim 70 can substantially fill the space 72 so that the force exerted by the friction stir welding device 80 in direction 90 is resisted by the skin 20 and the substructure 40 without substantial flexing of the skin 20 toward the substructure 40. That is, the shim 70 can prevent the skin 20 from deforming during the welding operation from the desired shape of the outer surface 12.

In other embodiments of the present invention, shims 70 can be used to fill other spaces defined between the skins 20, 30 and the substructure 40. For example, as shown in FIGS. 6 and 7A, adjacent skin portions or members 22a, 22b, 22c can define spaces 26a, 26b therebetween, and the shims 70 can be disposed in those spaces 26a, 26b. The shims 70 can have a variety of shapes and sizes, e.g., according to the respective space 26a, 26b between the skin members 22a, 22b, 22c in which the shim 70 is to be disposed. In some cases, the shim 70 can define a nonuniform width so that the shim 70 corresponds to the space 26a, 26b, even if the adjacent edges of the skin members 22a, 22b, 22c are not parallel or define curves, angles, or other nonuniformities. Further, the shim 70 can define a curved shape to correspond to the desired outer contour of the assembly 10. Thus, if the edges of the adjacent skin members 22a, 22b, 22c do not make contact when disposed on the substructure 40, each shim 70 can be used to bridge the respective space 26a, 26b between the skin members 22a, 22b, 22c and thereby achieve a continuous or otherwise desired contour of the outer surface 12.

The shim 70 can be friction stir welded to one or both of the adjacent skin members 22a, 22b, 22c and/or to the substructure 40. In some cases, the friction stir welding operation can plasticize the shim 70 across the width of the shim 70. That is, as shown in FIG. 7B, the shim 70 disposed in the space 26a is substantially completely consumed during the friction stir welding operation so that the resulting friction weld joint 62 extends through the width of the shim 70 between the edges of the skin members 22a, 22b. Alternatively, the formation of the friction stir weld joint 62 can plasticize only a portion of the width of the shim 70. For example, each of the edges of the shim 70 disposed in the space 26b are joined to the adjacent skin member 22b, 22c, with a portion 78 of the shim 70 between the edges remaining unplasticized during the friction stir welding operation so that two distinct friction stir weld joints 62 can be formed to connect the shim 70 to the respective skin members 22b, 22c. Thus, in some cases, the entire shim 70 can be plasticized during the friction stir welding operation while in other cases at least a portion of the shim 70 remains unplasticized throughout the welding operation.

The use, placement, and configurations of the shims 70 can be determined, at least in part, according to the spaces defined in the structural assembly 10. Typically, the shims 70 are not used for very small spaces or gaps in the assembly 10. For example, if the width of each space 26a, 26b between adjacent skin members 22a, 22b, 22c is small, such as about 10% or less than the thickness of the skin members 22a, 22b, 22c, then the space 26a, 26b can be closed without the use of the shim 70 by friction stir welding through the space to thereby fill the space with plasticized material from the adjacent members. Alternatively, if the space 26a, 26b is larger, e.g., about 10% or more than the thickness of the skin members 22a, 22b, 22c, then one or more of the shims 70 can be disposed in each space 26a, 26b before friction stir welding. As described above in connection with FIGS. 7A and 7B, in some cases only part of the shim 70 is plasticized during friction stir welding, while in other cases the entire shim 70 is plasticized, i.e., the shim is consumed during friction stir welding. Typically, if the shim 70 is relatively narrow, then the shim 70 is consumed during friction stir welding. Otherwise, if the shim 70 is relatively wide, only the edges of the shim 70 are plasticized and friction stir welded to the adjacent members such that the unplasticized portion 78 of the shim 70 acts as a splice between the two adjacent members 22b, 22c.

The members of the assembly 10 can be formed of a variety of materials. In one embodiment of the present invention, all or part of each of the skins 20, 30, substructure 40, and shims 70 are formed of aluminum or aluminum alloys. Each of the members of the skins 20, 30, the substructure 40, and the shims 70 can be formed of materials that are the same as or different than the materials of the other members of the assembly 10. That is, the shims 70 can be formed of a material that is the same or different than the materials of the skins 20, 30 and the substructure 40, which can also be formed of similar or different materials. The materials can be selected according to the desired materials properties for each member of the assembly 10. For example, in one embodiment, the skins 20, 30 are formed of 2000 series aluminum, which provides a high fatigue resistance, while the substructure 40 is formed of 7000 series aluminum, which provides high strength. The shims 70 can be formed of a material that can be easily machined so that a particular shape can be easily imparted to each shim 70 according to the space in the assembly 10 that is to receive the shim 70. The shims 70 can also be formed of a material that can be easily friction stir welded to the skins 20, 30 and/or the substructure 40. For example, the shims 70 can be formed of relatively pure aluminum or various alloys of aluminum.

Further, the material of at least a portion of the skins 20, 30, the substructure 40, and/or the shims 70 can have a granular structure that is refined during the friction stir welding operation. The materials with refined grain structure can also be characterized by improved material properties such as strength, durability, and/or corrosion resistance.

The skins 20, 30, substructure 40, and/or the shims 70 can be trimmed, treated, or otherwise processed after joining. For example, one or both of the skins 20, 30 can include tabs 14 for use in gripping the skins 20, 30 during manufacture, and the tabs 14 can be trimmed from the assembly 10 after the weld joints 60, 62 are formed. In addition, the assembly 10 and/or members thereof can be subjected to heat treatments or other material processes before or after the joints 60, 62 are formed, e.g., to improve and/or stabilize the material properties thereof.

The shims of the present invention can be similarly disposed between portions of various other structural assemblies. For example, the structural assembly 100 illustrated in FIGS. 8 and 8A can be used as a fuselage of an aircraft. The assembly 100 includes skin members 122 that are joined by longitudinally extending weld joints 160 so that the skin members 122 in combination define a generally cylindrical structure. Stringers 144, which can be elongate, beam-shaped members, are joined to an inner surface 116 of the skin members 122 by weld joints 162. The weld joints 160, 162 can be formed by friction stir welding, as described above. In addition, shims 170 can be positioned between the various members 122, 144 in spaces that are defined by the assembly 100 when the members 122, 144 are assembled. For example, if a space exists between a portion of one of the stringers 144 and the inner surface 116 of the corresponding skin member 122, one or more of the shims 170 can be disposed in the space. Similarly, one or more of the shims 171 can be disposed in a space between the skin members 122. During subsequent friction stir welding of the members 122, 144, the shims 170, 171 can be partially or entirely consumed, as described above in connection with FIGS. 7A and 7B.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of friction stir welding a rigid skin member to a rigid substructure to form a structural assembly, the method comprising:
   providing a substructure that includes a plurality of keels extending in a longitudinal direction and a plurality of bulkheads connecting the keels and defining a profile of the assembly;
   disposing the skin member on the substructure such that the skin member and the substructure define a space therebetween;
   disposing a shim in the space between the substructure and the skin member to substantially fill the space, the shim being disposed as a rigid solid member formed of solid metal; and
   friction stir welding the skin member to the substructure via the shim.

2. A method according to claim 1, further comprising providing the substructure having a plurality of joined members with an outer contour defining an airfoil.

3. A method according to claim 1 wherein said friction stir welding step comprises welding a first skin member to a first side of the substructure, and further comprising friction stir welding a second skin member to a second side of the substructure opposite the first side, such that the substructure extends between the first and second skins on the opposite sides.

4. A method according to claim 1 wherein said friction stir welding step comprises disposing a rotating friction stir welding tool through the skin member, through the shim, and into the substructure to thereby plasticize material of the skin member, the shim, and the substructure.

5. A method according to claim 1 wherein said friction stir welding step comprises forming an elongate weld joint along the skin member to connect the skin member to the substructure.

6. A method according to claim 1, further comprising forming the shim to have a thickness that is nonuniform along at least a portion of the length of the shim such that the shim corresponds to a shape of the space between the skin member and the substructure.

7. A method of friction stir welding a plurality of skin members to a substructure to form a structural assembly, the method comprising:
   disposing first and second skin members on the substructure such that the skin members define a space between the first and second skin members;
   disposing a shim in the space between the skin members, the shim being disposed as a rigid solid member formed of metal; and
   friction stir welding the first skin member to the second skin member via the shim and friction stir welding the first and second skin members to the substructure.

8. A method according to claim 7, further comprising providing the substructure having a plurality of joined members with an outer contour defining an airfoil.

9. A method according to claim 7 wherein said friction stir welding step comprises welding the first and second skin members to a first side of the substructure, and further comprising friction stir welding a third skin member to a second side of the substructure opposite the first side, such that the substructure extends between the third skin and the first and second skins on the opposite sides.

10. A method according to claim 7 wherein said friction stir welding step comprises disposing a rotating friction stir welding tool through the shim and thereby plasticizing material of the shim and the first and second skin members adjacent the shim.

11. A method according to claim 10 wherein said friction stir welding step comprises disposing the friction stir welding tool through the shim and into the substructure to thereby plasticize material of the skin members, the shim, and the substructure.

12. A method according to claim 7 wherein said friction stir welding step comprises forming an elongate weld joint along the shim to thereby join the skin members along the shim.

13. A method comprising:
disposing first and second skin members on a substructure such that the skin members define a space between the first and second skin members;
forming a shim to have a width that is nonuniform along at least a portion of the length of the shim such that the shim corresponds to a shape of the space between the skin members;
disposing the shim in the space between the skin members, the shim being disposed as a rigid solid member formed of metal;
friction stir welding the first skin member to the second skin member via the shim; and
attaching at least one of the first and second skin members to the substructure.

14. A method according to claim 1 wherein said step of disposing the shim comprises disposing a solid member comprising aluminum between the substructure and the skin member, at least one of the substructure and the skin member comprising aluminum.

15. A method according to claim 1 wherein said friction stir welding step comprises only partially consuming the shim.

16. A method according to claim 1 wherein said friction stir welding step comprises entirely consuming the shim.

17. A method according to claim 7 wherein said step of disposing the shim comprises disposing a solid member comprising aluminum between the first and second skin members, at least one of the skin members comprising aluminum.

18. A method according to claim 7 wherein said friction stir welding step comprises only partially consuming the shim.

19. A method according to claim 7 wherein said friction stir welding step comprises entirely consuming the shim.

20. A method of friction stir welding a rigid skin member to a rigid substructure to form a structural assembly, the method comprising:
providing a skin member, shim, and substructure, wherein the shim is formed of the same metal as at least one of the group consisting of the skin member and the substructure, and wherein the substructure includes a plurality of keels extending in a longitudinal direction and a plurality of bulkheads connecting the keels and defining a profile of the assembly;
disposing the skin member on the substructure such that the skin member and the substructure define a space therebetween;
disposing the shim in the space between the substructure and the skin member to substantially fill the space, the shim being disposed as a solid member; and
plasticizing and mixing material from the skin member, the shim, and the substructure to thereby friction stir weld the skin member to the substructure via the shim and refine the granular structure of the shim.

21. A method according to claim 20 wherein said plasticizing and mixing step comprises plasticizing only a portion of the shim to thereby only partially consume the shim.

22. A method according to claim 20 wherein said plasticizing and mixing step comprises plasticizing the entire shim to thereby entirely consume the shim.

23. A method according to claim 20 wherein said providing step comprising providing the shim formed of one of the group consisting of aluminum and aluminum alloys.

24. A method according to claim 20 wherein said step of disposing the shim comprises disposing the shim as a solid rigid metal member.

* * * * *